Patented June 9, 1936

2,043,897

UNITED STATES PATENT OFFICE 2,043,897

FOOD PROTECTING MATERIAL

Harold A. Levey, New Orleans, La.

No Drawing. Application October 26, 1931,
Serial No. 571,285

5 Claims. (Cl. 91—70)

The present invention relates to food containers and containing material and to coating methods and compositions therefor. It has particular reference to absorptive or fibrous material such as cellulose, in fibrous or in regenerated form, and articles made therefrom such as a felted-fiber bottle for milk or the like, and to a grease-proof and water-proof coating therefor suitable for economically adapting the material to serve as a container or wrapper for food and other materials. It has special reference to a milk bottle which may be used for the delivery of a daily milk supply to be discarded upon emptying. The invention is not limited to any specific material or container, but it has been specially developed and applied to solution of problems encountered in the milk bottle field. The milk bottle is at present the preferred embodiment of the invention and is therefore chosen to illustrate the nature of the invention.

Many attempts have been made to eliminate the usual glass milk bottle used in delivering daily supplies of milk. These are ordinarily collected, washed, refilled and delivered again, at expense. Fiber bottles which may be disposed of are manufactured as containers, but they present certain problems which are not readily solved within the range of economy permitted. The container must be water-proof, grease-proof and liquid tight, and the material employed must be such that it does not injure the food, and particularly those foods which readily absorb odors, such as butter and milk. Because the container is designed to be discarded, a minimum of material must be used to obtain a maximum effect.

Paraffin and other waxes have been proposed as a composition for water-proofing and grease-proofing fiber milk bottles, by impregnating the fiber with molten paraffin or wax. Containers are found on the market which are molded or formed in units, in one piece, from chemical wood pulp. Such containers are examples of any fiber container or sheet and of absorptive material which may be used in connection with this invention. To impregnate a thickness of fiber, like a sheet of paper, or such a bottle, with molten wax causes the absorption of too much wax. A fiber milk bottle such as that described is frequently quite rough on its interior, as compared to a sheet of paper, because it is not ordinarily calendered like a sheet of paper. A milk bottle such as is here referred to will absorb about its own weight of molten paraffin. This is too much paraffin for economy to make a practical milk bottle. When attempts are made to confine the absorption to the interior side, the diffusion to or toward the exterior is uneven and a mottled, and an inferior-looking article is produced. Another disadvantage of using so much paraffin or wax is the resulting increase in attendant materials which may give odor and taste to milk. In paraffin, especially, there are such materials, and by decreasing the paraffin, where that is employed, and in so using it, as described in this invention, the effects of such materials on the food are minimized or eliminated.

The use of organic solvents to control the application of paraffin or wax is undesirable because the solvents themselves and impurities therein, may introduce additional quantities and kinds of materials or residues which may flavor and contaminate the food. The use of a preliminary sizing of the absorptive material, prior to coating with a wax or paraffin, is undesirable because of the additional labor, time and materials necessary to do this.

Paraffin is at present the cheapest example of the available practical waxes which provide proofness to water and grease for the purposes of this invention, and the invention is therefore further illustrated by detailed reference to paraffin, which is to be considered merely as exemplary of fusible waxes.

One object of the present invention is the coating of an absorbent material or article with a composition containing solid wax to provide the material with a surface coat or film of wax in order to render the surface of the material or article water-proof and grease-proof.

A particular object is to coat the surface of a felted fiber sheet or form with a wax containing composition without impregnating the fiber at a depth with such material.

A particular object of the invention is the coating of the interior of a fiber milk bottle with a water-proof and grease-proof composition at such low expense that the process permits discard of the bottle.

Another object of the invention is the provision of a coating emulsion of wax having wax as the dispersed phase, and a liquid, like water, as the dispersing medium whereby the dispersing medium wets absorptive material and concentrates the wax on the surface.

A general object of the invention is the formation of a film of wax upon the surface of wetted absorptive material.

Still another object of the invention is the treatment of wax to remove impurities therefrom which may impart tastes and odors to food stuffs, by first emulsifying the wax.

Another object of the invention is the formation of wax coatings from wax particles by fusion in situ.

Various other and ancillary objects and advantages of the invention will become apparent from the following description and explanation of the invention from which those skilled in the art will readily understand its nature and be able to modify and vary the invention for other embodiments falling within the scope of the invention as defined by the appended claims.

According to one embodiment of the present invention I apply paraffin to the interior of a fiber bottle by depositing in the bottle an emulsion of the wax of the oil-in-water type. The water in the emulsion may be increased by dilution or decreased by evaporation or otherwise. Water is readily absorbed by the fiber, and the solid particles of wax, although small, are large enough to be restrained from penetrating the fiber. They reside on the interior surface as a coating of wax particles more concentrated on the surface than in the emulsion. The emulsion may be applied by brushing, spraying, dipping, rolls, by pouring or flowing, or by any other means mechanically adapted to the form of fiber being treated, and adapted to the viscosity of the emulsion employed.

It is a particular advantage that a single application is sufficient. After the emulsion is applied to the interior of a fiber milk bottle, the same is heated to a temperature in the region of the fusion point of the wax, but preferably not to the melting point or to such a temperature that it becomes melted and highly fluid. The heat softens the compacted mass of wax particles and they fuse together into a continuous film. The fiber is wetted with the water from the emulsion during this process of fusion and coalescence, and the wetted fibers repel the liquid or viscous softened paraffin or other wax. Then the article is cooled to a point where the wax film is solidified. During the heating and after the cooling water is allowed to evaporate from the outside of the bottle.

As an example of a suitable emulsion I may employ:

| | Per cent |
|---|---|
| Water | 72 |
| Amino-soap | 3 |
| Wax | 25 |

This is a general example of proportions, but it will be understood that the proportions may be varied. I have varied the above formula as follows:

| | Parts |
|---|---|
| Paraffin wax (melting point 55.5° C.) | 100 |
| Tri-hydroxy-ethyl-amine stearate | 12 |
| Water | 288 |

In the above formulas the amino-soap is an emulsifier or stabilizer, of which others are known to the art, such as tri-ethenol-amine stearate, or ammonium linoleate. The soap may be dissolved in the water, the solution heated to 90° C., and the paraffin, or other wax added in melted form with vigorous agitation, being preferably added in small amounts at a time or continuously over a prolonged period. Agitation is continued and the mass cooled to solidify the wax. A thick, creamy, snow-white viscous mass results.

The emulsion may be thinned by adding water, and the thinness will regulate the amount of wax which may be deposited from a coating of the emulsion. A sheet of absorptive material, such as cloth, regenerated viscose, paper, or a fiber article may be coated on the surface. The coated article, such as the milk bottle is then heated to fuse and unite the wax particles into a surface film, which is prevented from entry into the sheet by the wet material which preferentially absorbs the water.

For the milk bottle coated with a wax melting at 55.5° C., I place the bottle, coated on the inside, in an oven at 65°–70° C. The evaporation of water cools the bottle so that it does not attain the high temperature of the oven. When the wax has fused and formed a film, a great part of the water will have been evaporated from the fibers, and the bottle may be cooled to below the fusion point and any residual water evaporated to an equilibrium condition with air. Ordinary fiber reaches equilibrium with a retention of about 10% of moisture.

A quart milk bottle so coated weighs about 50 grams of which about 5 grams is paraffin. If it were dipped in molten paraffin it would absorb about 50 grams of paraffin. Consequently a minimum amount of paraffin is used and a minimum amount of impurities of paraffin are introduced. The prior formation of an emulsion distributes large quantities of these impurities into the dispersing liquid and they are carried into the fiber and away from the paraffin surface. The amino-soap or other emulsifier which is formed into a thin film about each particle of wax in the emulsion is found in the final product on the side of the paraffin film next to the paper or fiber.

Another way of carrying out the invention, which is less satisfactory however, in some respects, is to wet the milk bottle with water or the like, so that its capacity for absorption is largely satisfied. Powdered fusible material, such as finely powdered grains of paraffin may be dusted onto the interior wet surface. The article may then be treated as above described for fusing the grains together.

Although I have specified that I prefer to cool the fused layer of wax film quickly, it is to be understood that this is not necessary. It may be held heated, and viscous or liquid, while the material is wetted, or while it is drying. Because there is a relatively small amount of wax present it cannot penetrate deeply into the fibers or other material, as its supply becomes exhausted. In such an instance the surface fibers only may be impregnated with wax and a continuous film is still presented in which the substance of the coated material is incorporated. By permitting slight penetration of liquid wax and cooling before complete penetration, the character of the wax film may be controlled as desired.

It is to be understood that dyes may be incorporated into the emulsion, either for the water or for the wax phase, and that pigments likewise may be employed in suspension like the wax particles, where colored effects are desired. Animal and vegetable and mineral fats and waxes may be used such as carnauba, candelilla, bayberry, beeswax, spermaceti, ceresin, paraffin and others. By the term "wax" I intend to include in the list others than those mentioned which may be of artificial character as distinguished from products of nature, such as chlorinated hydrocarbons, like chlorinated napthalene (halo-waxes), chlorinated diphenyls (arochlors), and other types such as higher-fatty acids, their glycerides, and many resin-like bodies. Emulsifiers such as ammonia and alkali-soaps may be used instead of the organic amino-soaps. Agents other than water may be used as the dispersing medium, provided of course that such an agent is a non-solvent for the wax, is capable of wetting the material to be coated, and further capable of removal without destroying the wax film.

Herein and in the appended claims the term "grease-proof" is to be considered functionally as a relative term, and is not to be construed as meaning absoluteness in degree. Certainly some oils or greases may dissolve the wax or penetrate it and enter the fiber, but where oils or grease, such as the fat bodies of milk or cream, are emulsified, the grease-proof quality is very high. The water or liquid phase of such emulsions insulates the emulsified grease from direct contact with the wax, and the water or liquid phase is excluded by the wax. For this reason the bottle herein described is substantially "grease-proof" to milk, cream and the like.

The present invention is not limited to the use of cellulose in felted fibrous form or in film form, but includes other suitably absorptive materials such as natural wood, gelatine sheets, casein films, porous ceramic masses, such as pottery or baked clay, cellulose acetate, cellulose ethers and esters, and the like, when such materials have a form which presents an outlet for water other than on the wax coated surface. The material must be wetted by the liquid medium carrying the wax so that it remains wetted when the emulsion is broken by heat to form a film, which film is cooled in situ on the wetted material. Water in the material is thus locked in by the wax film against removal through the wax, and therefore must escape from another part of the absorptive material. It is preferable that the absorption be provided both by the character of the material, and by the structural arrangement of the material, such as by the fibers of paper, and by the capillarity of felted fibers. It is preferred to use materials of high absorption power so that the water of the emulsion is rapidly and quite completely sucked out of the emulsion, leaving particles of wax as a residue. Some materials having a lesser absorptive power may be very slow in taking up the water, and evaporation from the emulsion on the coated side may take place during the abstraction of water by the material. When any material is insufficiently absorptive of water so that it is not preferentially wetted when the wax is melted, permitting penetration of the material by the wax, it is considered that the material is not "absorptive" for the purposes of this invention. The advantage of the invention is the ability of the wetted material to prevent penetration of wax into the material, whereby a localized film of predetermined thickness can be made.

The invention is to be distinguished from other processes of coating materials with wax wherein a liquid vehicle for wax is evaporated or otherwise removed directly from the surface to be coated, so as to leave a residue of wax on said surface. In the present invention the liquid vehicle for wax, such as the water in the emulsion, is removed from the wax by the material, and after the residual wax is heated and cooled to form a continuous film while the liquid is in the absorptive material, the liquid in the material is removed from the material by an outlet other than the coated surface.

It is to be understood that the present invention is not to be considered as limited to and by the specific examples herein given, but it is to be considered as broader in scope, commensurate with the changes and modifications herein indicated, and those contemplated by the invention as expressed in the appended claims.

The herein disclosed emulsion may contain from one-fourth to one-third emulsified solid wax particles.

I claim:

1. The method of applying a non-porous coating of wax to one surface only of a container of fibrous capillary material having relatively high absorptive properties comprising applying an emulsion consisting essentially of wax, an emulsifying agent and a volatile liquid which is a non-solvent for the wax to one side of the material at a temperature below the fusion point of the wax, said liquid being adapted to wet said capillary material and be removed therefrom without destroying the wax coating thereon, heating the treated surface to approximately the fusion point of the wax to simultaneously break the emulsion, and to fuse the wax into a continuous surface film, the liquid of the wax emulsion penetrating the capillary material and being evaporated from the uncoated side of the material.

2. The method of applying a non-porous coating of wax to one surface only of a container of fibrous capillary material having relatively high absorptive properties comprising applying an emulsion consisting essentially of wax, an emulsifying soap and a volatile aqueous liquid which is a non-solvent for the wax to one side of the material at a temperature below the fusion point of the wax, said aqueous liquid being adapted to wet said capillary material and be removed therefrom without destroying the wax coating thereon, heating the treated surface to approximately the fusion point of the wax to simultaneously break the emulsion, and to fuse the wax into a continuous surface film, the liquid of the wax emulsion penetrating the capillary material and being evaporated from the uncoated side of the material.

3. The method of applying a non-porous coating of wax to one surface only of a container of fibrous capillary paper having relatively high absorptive properties comprising applying an emulsion consisting essentially of wax, an emulsifying soap and a volatile aqueous liquid which is a non-solvent for the wax to one side of the paper at a temperature below the fusion point of the wax, said aqueous liquid being adapted to wet said capillary paper and be removed therefrom without destroying the wax coating thereon, heating the treated surface to approximately the fusion point of the wax to simultaneously break the emulsion, and to fuse the wax into a continuous surface film, the liquid of the wax emulsion penetrating the capillary paper and being evaporated from the uncoated side of the paper.

4. The method of applying a non-porous coating of wax to one surface only of a container of fibrous capillary material having relatively high absorptive properties comprising applying an emulsion consisting essentially of paraffine wax, an emulsifying soap and a volatile aqueous liquid which is a non-solvent for the wax to one side of the material at a temperature below the fusion point of the wax, said aqueous liquid being adapted to wet said capillary material and be removed therefrom without destroying the wax coating thereon, heating the treated surface to approximately the fusion point of the wax to simultaneously break the emulsion, and to fuse the wax into a continuous surface film, the liquid of the wax emulsion penetrating the capillary material and being evaporated from the uncoated side of the material.

5. The method of applying a non-porous coating of wax to the inside surface only of the container of fibrous capillary material having relatively high absorptive properties comprising applying an emulsion consisting essentially of wax, an emulsifying soap and water to the inside surface of the container at a temperature below the fusion point of the wax, heating the treated surface to approximately the fusion point of the wax to simultaneously break the emulsion, and to fuse the wax into a continuous surface film, the liquid of the wax emulsion penetrating the capillary material from the inside surface towards the uncoated surface and being evaporated from the uncoated surface.

HAROLD A. LEVEY.